INVENTOR.
WILLY HOEFLER

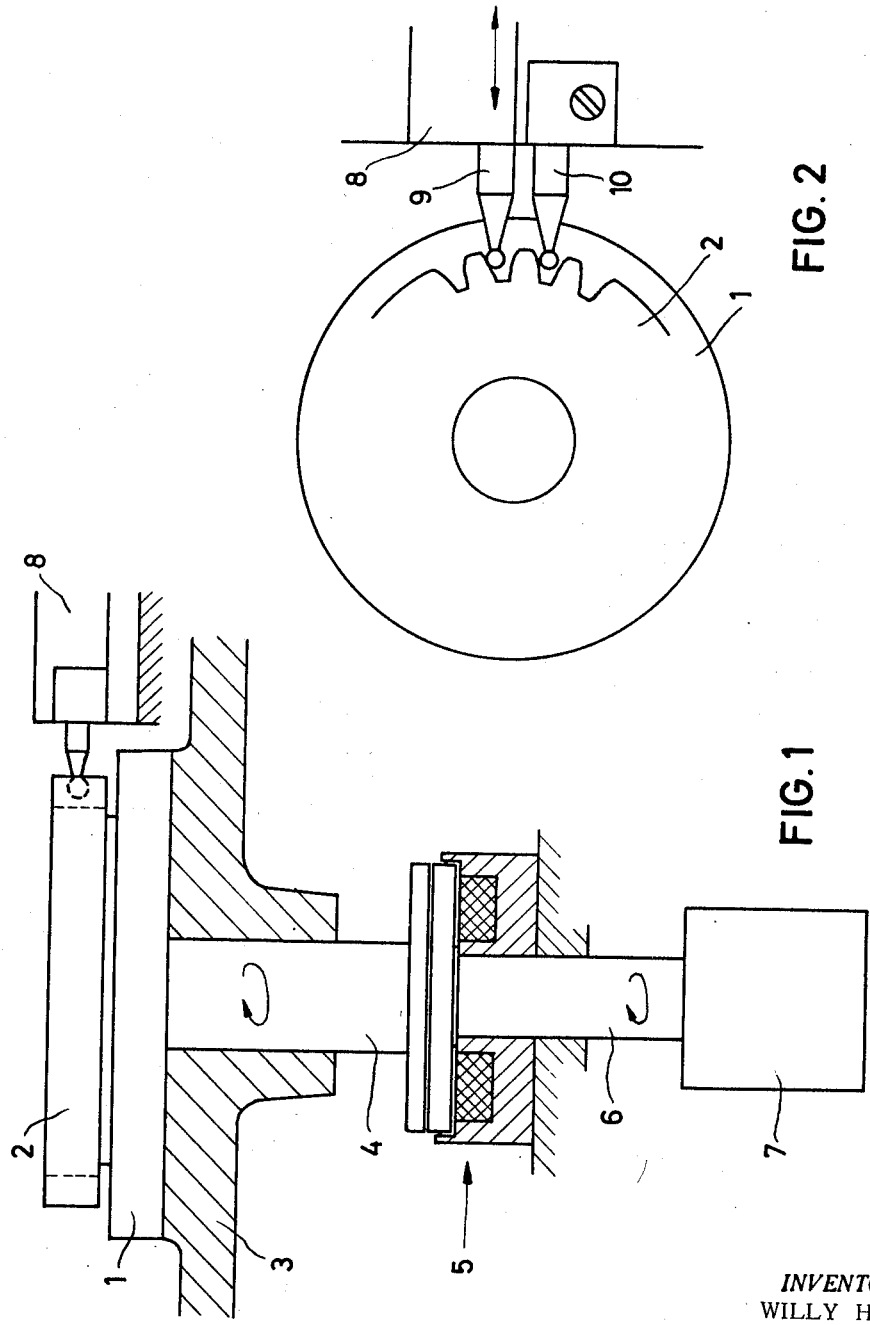

United States Patent Office 3,494,043
Patented Feb. 10, 1970

3,494,043
DRIVE MECHANISM FOR GEAR TESTING APPARATUS
Willy Höfler, 38c Elbinger Strasse, 75 Karlsruhe, Germany
Filed Apr. 25, 1968, Ser. No. 724,053
Claims priority, application Germany, May 13, 1967, H 62,731
Int. Cl. G01b 19/26
U.S. Cl. 33—179.5
9 Claims

ABSTRACT OF THE DISCLOSURE

For turning a gear intermittently for one tooth pitch at a time to permit measurements to be carried out on each tooth while the gear is stopped, the gear is driven by a magnetic friction clutch and stopped by inserting a stop member into a tooth gap. This stop member then abuts against the front flank of the next gear tooth and remains in contact therewith due to the friction between the driving and driven members of the clutch which then slide along each other. As soon as the stop member is withdrawn from the tooth gap at the end of the measuring operation, the clutch members are again in positive engagement with each other and turn the gear until the stop member is again inserted into the next tooth gap and abuts against the next tooth flank.

BACKGROUND OF THE INVENTION

Field of the invention

The present invention relates to a gear testing apparatus and more particularly to a drive mechanism for producing intermittent rotary motions of a machine table on which a gear with straight or helical teeth is mounted the tooth pitch of which is to be measured by a measuring instrument comprising a fixed stop member and a movable tracer which are to be moved into two adjacent tooth gaps and into engagement with the tooth flanks of the gear.

Description of the prior art

Gears which are to be employed, for example, in high-grade transmissions have to comply with very high requirements and therefore must first be subjected to a series of tests to determine their accuracy. Only when the values of all deviations from the desired dimensions of all gears for such a transmission are accurately determined, it is possible to predict exactly the transmitting accuracy, the noise level, the life expectancy, and other features of the transmission. In actual practice it is, however, possible to determine accurately only some of the large number of deficiencies which may occur in the production of gears, and the tests made are therefore usually limited to the particular purpose for which the gears are to be subsequently employed and as to whether large torques or constant angular velocities are to be transmitted by the gears. Especially in gear transmissions in which constant angular velocities are to be transmitted, it is absolutely necessary to measure the angular errors of the gear teeth. These errors may be determined by the one-flank testing method in which only the front flank of each gear tooth is tested. Whereas the conventional two-flank rolling test requires a master gear which is in mesh with the gear to be tested and permits certain deficiencies to be determined during one continuous revolution of the two gears from the changes in their axial distances from each other, the one-flank testing method to which the present invention relates does not require such a master gear but a measuring instrument which comprises a pair of tracers are adapted to measure the distance between two adjacent gear teeth on a certain radius of the gear and are for this purpose inserted successively into all tooth gaps of the gear. The number of tests which then have to be made therefore corresponds at least to the number of teeth of the respective gear.

Such a test may be carried out in two different manners. According to the first manner, a gear to be tested which is mounted on a measuring table carries out a continuous rotary movement, while the tracers of the measuring instrument are moved into adjacent tooth gaps in the direction toward the center of the gear. After a certain length of time $t_0$, the rotary movement of the gear causes the flanks of the teeth to engage with the measuring tracers which during the time $t_1$ determine the distance between them on a certain radius of the gear. The tracers then engage upon the front flanks of the teeth, as seen in the direction of rotation of the gear. When the measuring time $t_1$ has passed, the movement for withdrawing the tracers from the tooth gaps in the same direction in which they were inserted normally requires the same length of time $t_0$ before the face of the tooth intermediate two adjacent tooth gaps intersects the line of movement of the tracers. If the rotation of the gear to be tested is relatively slow, the withdrawing motion of the tracers might possibly be accelerated so that the tracers will disengage from the curved contours of the tooth flanks instead of being pivoted by the rotating gear beyond an admissible angle from their normal position. Such a relatively slow rotation of the gear to be tested means, however, that the period of time required to carry out all tests will be relatively long. The available length of time for carrying out each individual test may be better utilized if after the period $t_0+t_1$ the measuring instrument and especially the measuring tracers thereof are pivoted for a period $t_2$ out of the tooth gaps. The speed at which this pivoting movement is to be carried out depends upon the angular velocity of the gear to be tested. Although this, of course, permits the gear to be moved at a higher speed and the entire length of time required for the measurements to be reduced, the different sizes of the gears, the different shapes of their teeth, and especially the different numbers of teeth on the gears to be tested require very expensive mechanical and electronic control means for varying the movements of the measuring elements.

The second method of measuring toothpitch errors ties to overcome the above-mentioned disadvantage by moving the tracers of the measuring instrument into and out of the tooth gaps in the same direction, that is, substantially in the direction toward the center of the gear to be tested, and by advancing the gear after each test by one tooth pitch. Although at first glance it might appear that this method had the advantage of a saving in cost over the first method as above described, this is erroneous since it requires suitable means for intermittently moving each gear to be tested about a certain angle which differs in accordance with the varying size and number of teeth of the different gears to be tested.

All of the testing apparatus as previously described have the disadvantage that for carrying out the tests within the shortest possible period of time, it is necessary to provide very expensive mechanical and electronic means which usually also remain operative only for a relatively short time because of the rough usage to which such apparatus are usually subjected.

It is therefore an object of the present invention to provide a very simple and inexpensive drive and stop mechanism for turning any gear regardless of its size, weight, or number of teeth very accurately for one tooth pitch at a time so as to permit at least one test, especially a test for measuring errors in tooth pitch, to be carried out on each tooth while the gear is stopped without requiring any complicated and expensive mechanical or electronic means for controlling the movements of the gear.

SUMMARY OF THE INVENTION

For attaining this object, it is one feature of the present invention to divide the shaft for driving the machine table on which the gear to be tested is mounted into at least two separate parts one of which is positively connected to the machine table, while the second part is connected to suitable driving means, and to provide suitable clutch means for frictionally connecting the two shaft parts to each other when necessary for advancing the gear by one tooth to carry out the next test.

A feature of one preferred embodiment of the invention consists in providing the driving means in the form of an electric motor for driving the second shaft part continuously, while according to another preferred embodiment it is a feature of the invention to drive the second shaft part intermittently by means of a lever which is secured to and extends radially from this shaft part and may be pivoted back and forth by a drive mechanism which is adapted to carry out reciprocating strokes at intervals, for distances and with a power which may be varied by simple control means in accordance with the size, weight and number of teeth of the particular gear to be tested.

According to another feature of the invention it is advisable to provide the clutch means for connecting the two parts of the drive shaft to each other in the form of a magnetic friction clutch and preferably a plate clutch.

By providing such a magnetic clutch between the two parts of the drive shaft which are connected to the motor and to the machine table, respectively, it is possible to carry out the necessary pitch tests on any gear by moving a fixed and a movable tracer periodically into one pair of adjacent tooth gaps after another. The fixed tracer then serves as a stop member which, when inserted into a tooth gap, engages under the continued driving force of the magnetic clutch with the front flank of the next tooth and thereby stops the rotary movement of the machine table and the gear thereon for a certain period of time which is required for carrying out one testing operation and during which the magnetic clutch slips. At the end of this period, the tracers are retracted from the gear which is then immediately advanced by one tooth pitch by the drive shaft, both parts of which are then again driven at the same speed since they are again positively connected to each other by the magnetic clutch. The fixed tracer or stop member, which is preferably of a chisel-like shape and projects slightly toward the gear beyond the position of the movable tracer so as to enter a tooth gap shortly before the latter enters the adjacent gap, absolutely prevents collision of the sensitive movable tracer with the face of any tooth and thus a destruction of this tracer and a damage of the measuring instrument to which it is connected. The operation of the measuring instrument may be adjusted in accordance with the different kinds of gears to be tested by varying the length of the strokes of this instrument or the tracers thereof, by driving the second part of the drive shaft which is connected to the motor at a constant speed, and by varying the electromagnetic field of the plate clutch in accordance with the size of the gear to be tested and by thus varying the torque which is to be transmitted by the clutch to this gear. All of these adjustments may be carried out in a very simple manner according to a completely linear characteristic and in perfect coordination with each other.

If the gear to be tested exceeds a certain size, it is advisable not to employ a constantly rotating motor for driving the gear to be tested through the magnetic plate clutch, but to employ instead a drive mechanism which advances the gear in steps of approximately the size of one tooth pitch. The shaft part which is to be driven directly by the drive mechanism is for this purpose provided with a lever which is rigidly secured thereto and extends radially therefrom and is adapted to be moved by a solenoid or by a hydraulically or pneumatically actuated cylinder. When employing a solenoid, the armature of the latter may be retracted to its neutral position, for example, by means of a spring. During the power stroke of the armature of this solenoid which effects a one-step rotation of the shaft part to which it is connected by the lever, this rotation is transmitted through the other shaft part to the machine table and the gear to be tested by the engagement of the magnetic plate clutch which then connects the two shaft parts positively to each other. While the length of the strokes of the armature of the solenoid may be adjusted in a very simple manner in accordance with the particular gear to be tested, for example, by means of a setscrew or the like, such an adjustment does not have to be very accurate, and the length of the stroke of this armature may even exceed considerably the length which would be required for advancing the gear by one tooth pitch since the magnetic clutch will slip in the same manner as described with reference to the first embodiment of the invention as soon as the fixed tracer after being inserted into a tooth gap of the gear to be tested abuts against the front flank of the next tooth and thereby stops the gear. As soon as the measuring operation has been completed the magnetic clutch is switched off so as to permit the armature of the solenoid to be returned to its original position by the retracting spring. While the fixed tracer is then being withdrawn from the tooth gap, the magnetic clutch is again switched on and the solenoid is likewise energized so as to turn the gear for another tooth pitch.

From the above description it is evident that neither of the embodiments of the invention requires any expensive mechanical or electronic means for moving the gear from one to the next testing position. The magnetic plate clutch in cooperation with the fixed tracer or stop member always effects a reliable control of the rotary movements of the machine table so as to permit the necessary pitch tests to be carried out on gears of any size and with any number of straight or helical teeth.

BRIEF DESCRIPTION OF THE DRAWINGS

The features and advantages of the present invention will become further apparent from the following detailed description thereof which is to be read with reference to the accompanying diagrammatic drawings of two preferred embodiments of the invention, in which—

FIGURE 1 shows, partly in section, a side view of the most essential parts of a gear testing apparatus which is driven by an electric motor;

FIGURE 2 shows a top view of the machine table according to FIGURE 1 on which a gear is mounted which is to be tested, and of the two tracers of the measuring instrument when inserted into two adjacent tooth gaps of the gear;

FIGURE 3 shows a view similar to FIGURE 1 of the most essential parts of a gear testing apparatus which is driven by a solenoid; while FIGURE 4 shows, partly in section, a bottom view of the solenoid according to FIGURE 3.

DESCRIPTION OF THE PREFERRED EMBODIMENTS

Figures 3, 4:
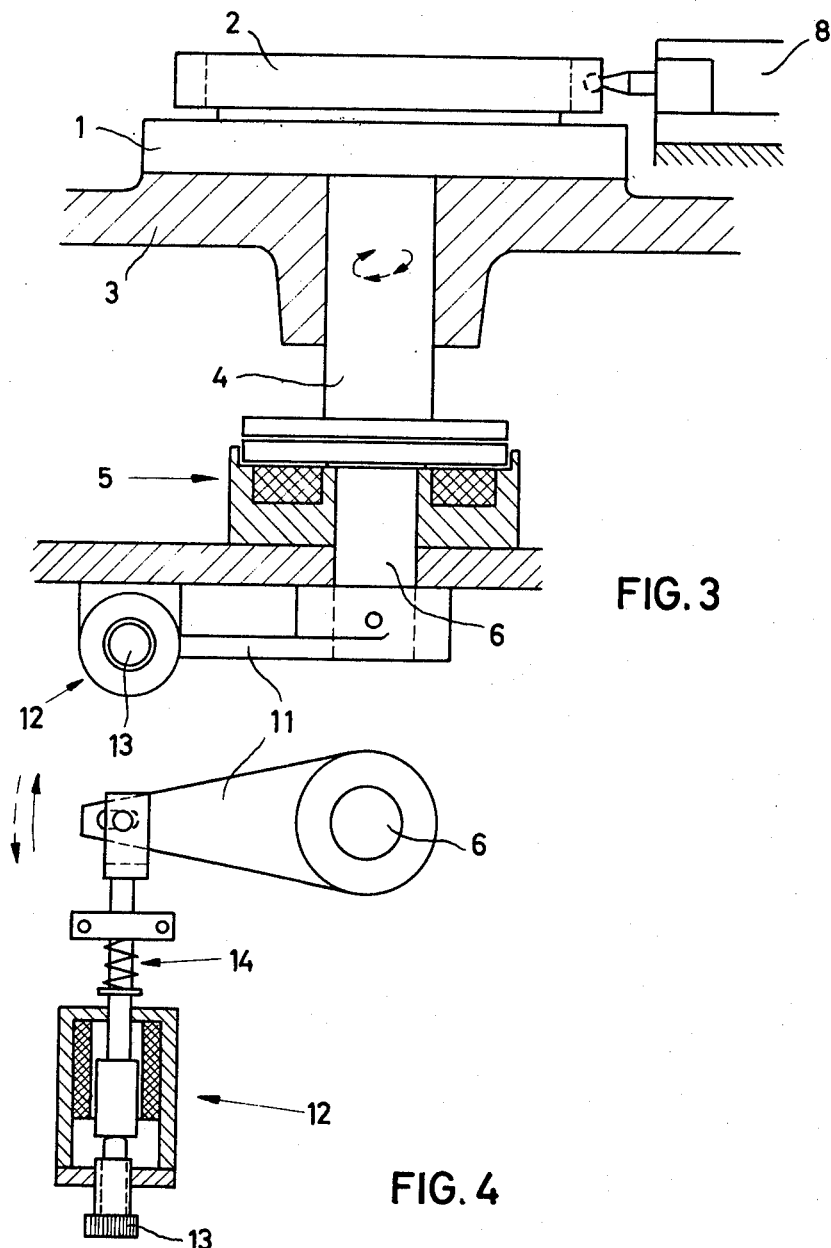

FIGURES 1 and 2 illustrate diagrammatically a gear testing apparatus according to a first embodiment of the invention which comprises a machine table 1 which is provided with suitable means for mounting thereon a gear 2 which is to be tested. Table 1 together with gear 2 is adapted to be rotated by a shaft 4 which extends vertically through and is guided by a cast frame 3. The driving means for the machine table 1 and the gear 2 consist in this particular embodiment of the invention of a motor 7 with a shaft 6 which is driven at a constant speed and is adapted to be connected by a magnetic plate clutch 5 to the shaft 4 so as to transmit its rotary motion to the machine table 1. As illustrated particularly in FIGURE 2, a fixed measuring tracer 10 and a movable measuring tracer 9 of a measuring instrument 8 are adapted to be moved substantially in the direction toward the center of gear 2 into two adjacent tooth gaps. By varying the strength of the current for energizing the magnetic clutch 5 so as to be in accordance with the size and weight of the gear to be tested, it is possible to adjust the electromagnetic field of this clutch so that the positive connection between the two disks of clutch 5 and thus between shaft 6 which is driven by motor 7 at a constant speed and shaft 4 which is connected to the machine table 1 discontinues and the clutch starts to slip as soon as the fixed tracer 10 after being inserted into a tooth gap abuts against the front flank of the next tooth and thereby stops immediately the movement of the machine table 1 and gear 2. If desired, suitable damping means may be provided to soften the impact of the gear tooth upon the fixed tracer 10. After the measuring operation on one gear tooth has been carried out in a conventional manner, tracers 9 and 10 are retracted from the tooth gaps of gear 2. As soon as during this retracting movement the fixed tracer 10 disengages from the tooth flank of gear 2, the magnetic clutch 5 will again become fully active and gear 2 will again be turned at the speed of motor 7 until it will again be stopped when tracers 9 and 10 are inserted into the next appropriate tooth gaps and the fixed tracer 10 acting as a stop member engages upon the front flank of the next tooth.

FIGURES 3 and 4 illustrate a modification of the invention in which the shaft 6 is not driven at a constant speed but moved by a solenoid 12 via a lever 11 at certain intervals for a distance which is preferably slightly larger than the angle of one tooth pitch, i.e. the angle between two adjacent gear teeth. When the armature of solenoid 12 carries out its forward stroke, the magnetic field of clutch 5 will transmit the torque of shaft 6 to shaft 4 of table 1 and thereby turn the gear 1 until tracers 9 and 10 are moved into two adjacent tooth gaps and tracer 10 stops the rotation of the gear for the duration of the testing operation. As soon as this operation is completed, clutch 5 will be switched off and the armature of solenoid 12 will be returned by spring 14 to its neutral position as shown in FIGURE 4. While the tracers are then being retracted, clutch 5 will again be switched on and solenoid 12 will also be energized so as to turn the gear for another step until it is again stopped by the insertion of traced 10 into the next tooth gap and its engagement with the next tooth flank.

The apparatus according to FIGURES 3 and 4 may be employed especially for testing relatively large gears. It is, however, not necessary to advance the gear after each individual test for the exact distance of one tooth pitch, but as already indicated above it is advisable to adjust the length of the strokes of solenoid 12 so that also in this case the fixed tracer 10 after being inserted into the respective tooth gap will stop the rotation of gear 2 and thereby cause the magnetic clutch 5 to slip. The fixed tracer 10 is made sufficiently solid in both embodiments of the invention as illustrated in the drawings so as to stop the rotary movement of gear 2 without damage and to continue to engage upon the front flank of a gear tooth under the torque which is exerted by the slipping friction clutch 5 while the other tracer 9 carries out its measuring operation.

The length of the strokes of the armature of solenoid 12 may be adjusted in a very simple manner by means of a setscrew 13 so as to effect one-pitch rotations of gears of different diameters and different numbers of teeth.

Although my invention has been illustrated and described with reference to the preferred embodiments thereof, I wish to have it understood that it is in no way limited to the details of such embodiments but is capable of numerous modifications.

Having thus fully disclosed my invention, what I claim is:

1. A gear testing apparatus comprising a measuring instrument, a drive mechanism for rotating a gear to be tested about its axis and for stopping said gear at periodic intervals after being turned for a certain distance so as to permit a test to be carried out at each interval on said gear by means of said instrument, said drive mechanism comprising a first shaft, driving means for turning said first shaft, a second shaft for turning said gear, a friction clutch for connecting said two shafts to each other, and a stop member adapted to be inserted during each of said intervals into a tooth gap of said gear and thereafter to be withdrawn from said tooth gap, said stop member abutting during said interval against the front flank of the next gear tooth so as to stop said gear and thereby causing said friction clutch to slip and said tooth to press against said stop member under the action of said slipping clutch.

2. A gear testing apparatus as defined in claim 1, wherein said driving means comprise an electric motor for continuously driving said first shaft at a constant speed at least until all tests are carried out by said instrument on said gear.

3. A gear testing apparatus as defined in claim 1, wherein said driving means comprise a lever secured at one end to said first shaft and projecting radially therefrom, and a drive element pivotably connected to the other end of said lever and adapted to carry out successive driving and return strokes of such a length that said first shaft will be turned back and forth by said lever about an angle equal to more than one tooth pitch of said gear, said stop member when inserted into a tooth gap stopping the further rotation of said gear caused by the continued driving stroke of said drive element and thereby causing said clutch to slip during the subsequent test on said gear, said clutch being disengaged and said drive element carrying out its return stroke when said test is completed, said clutch again being engaged and said drive element starting to carry out its next driving stroke when said stop member is being retracted so as to turn said gear for another step.

4. A gear testing apparatus as defined in claim 3, further comprising means for varying the length of said strokes of said drive element.

5. A gear testing apparatus as defined in claim 1, wherein said clutch comprises a magnetic plate clutch.

6. A gear testing apparatus as defined in claim 3, wherein said drive element comprises a solenoid adapted to be switched on to carry out a driving stroke and to be switched off at the end of said stroke, and spring means for effecting the return stroke of said solenoid so as to return it to its neutral position at the end of said driving stroke.

7. A gear testing apparatus as defined in claim 6, wherein said clutch consists of a magnetic plate clutch adapted to be switched on and off in coordination with said forward and return strokes of said solenoid.

8. A gear testing apparatus as defined in claim 6, further comprising a setscrew for adjusting the length of the strokes of said solenoid.

9. A gear testing apparatus as claimed in claim 1, said clutch again engaging and driving said second shaft and said gear at the speed of said driving means as soon as said stop member is withdrawn from said tooth gap at the end of one of said intervals and until said stop member is inserted into another tooth gap.

References Cited

UNITED STATES PATENTS 3,069,779    12/1962    Bauer.

LEONARD FORMAN, Primary Examiner

D. A. DEARING, Assistant Examiner